United States Patent Office 3,366,594
Patented Jan. 30, 1968

3,366,594
DI-INDENE REINFORCING PLASTICIZERS AND THE USE THEREOF IN BUTYL RUBBER
George W. Feeney, Pittsburgh, and Harvey B. Wheeler, Green Tree, Pa., assignors to Neville Chemical Company, Pittsburgh, Pa., a corporation of Pennsylvania
No Drawing. Filed Nov. 3, 1964, Ser. No. 408,675
8 Claims. (Cl. 260—33.6)

ABSTRACT OF THE DISCLOSURE

Di-indene and certain high boiling aromatic hydrocarbon oils rich in di-indene are used as plasticizing and reinforcing agents for butyl rubber. The resulting compositions have excellent tack and good vulcanization characteristics. When vulcanized, they have excellent physical properties.

---

This invention relates to an improvement in compounding butyl rubber. More particularly it relates to the use of certain unsaturated aromatic hydrocarbons or hydrocarbon mixtures as compounding agents for butyl rubber. Still more specifically it relates to the use of di-indene and certain high boiling aromatic oils rich in di-indene as plasticizing and reinforcing agents for butyl rubber and to the improved rubber compositions resulting therefrom.

The use of various mineral oil or coal tar oil fractions as processing aids or plasticizers for elastomers of various kinds is well known. However, the choice of such agents suitable for use in butyl rubber has been very limited because of the tendency of many such agents to interfere with the vulcanization characteristics of butyl rubber. Because of the relatively low degree of unsaturation which is characteristic of butyl rubber, the art has heretofore quite generally considered that a compounding agent for butyl rubber should be substantially fully saturated. Even aromatic oils of moderate or high aromatics content and free of olefinic unsaturation have been generally known to exert an undesirable cure-retarding effect on butyl rubber though they have been effectively used in processing the more unsaturated types of rubber such as polyisoprene or SBR rubber. Consequently, paraffin wax, light paraffinic process oils, ester-type plasticizers such as dioctyl phthalate or hydrogenated rosin esters are representative of plasticizers or processing aids conventionally used with butyl rubber.

Conversely, while various oils of coal tar origin have been heretofore successfully used with rubbers of high unsaturation, such as natural rubber, butadiene-styrene copolymers (SBR) and butadiene-acrylonitrile copolymers, their use in butyl rubber has been shied away from because of their retarding effect on the vlucanization of the resulting butyl rubber compounds. Thus, for instance, "dipolymer oil" (a liquid coal tar fraction including coumarone and indene resins and lower boiling aromatic and vinyl aromatic compounds) is a useful plasticizer for most natural and synthetic rubbers. However, standard compounding handbooks expressly caution against the use of this type of plasticizer in butyl rubber.

It is an object of this invention to provide an improvement in the compounding of relatively saturated high molecular weight polymers or copolymers of olefins such as butyl rubber. Another object is to provide improved butyl rubber compositions containing plasticizers of coal tar origin. A still more specific object is to provide improved elastomer compositions by compounding butyl rubber with a plasticizing amount of di-indene or high boiling aromatic oils rich in di-indene. These and other objects, as well as the nature, operation and advantages of this invention will become more clearly apparent from the subsequent description.

According to the present invention, a particular type of material derivable from coal tar is provided whch is unexpectedly useful as a compounding ingredient for butyl rubber despite its substantial unstaturation. More particularly, it has now been discovered that low polymers of indene (benzocyclopentadiene) such as di-indene constitute excellent plasticizers for butyl rubber despite their substantial degree of unsaturation. In fact, it has been discovered that di-indene and high boiling oils rich in di-indene not only do not undesirably impair the vulcanization characteristics of the resulting butyl rubber compounds, but actually tend to impart a desirable tack to the rubber compound before vulcanization and reinforce as well as soften the resulting vulcanizate. Since lack of tack has been one of the disadvantages of butyl rubber when using it for tire construction and the like, the ability of improving such tack with the aid of relatively inexpensive materials of coal tar origin represents a valuable aspect of the present invention.

Pure or substantially pure di-indene constitutes one embodiment of a plasticizer useful according to this invention. It can be prepared by the condensing action of acids, e.g., by refluxing indene with acetic acid. The product is an oil which boils at 235°–245° C. at 16 mm. Hg pressure and crystallizes on cooling. At atmospheric pressure it distills essentially at 340°–350° C. When recrystallized from acetic acid it forms spherical crystalline dregs which melt at 51° C. A dimer product melting at 57°–58° C. can be obtained by repeated recrystallization from aqueous ethanol or aqueous acetic acid when the polmerization method of Stobbe et al is used. See Egloff, "Reactions of Pure Hydrocarbons," Reinhold Publishing Co. (1937), page 644. Generally speaking, the di-indene produced by any of the known indene dimerization methods will have a melting point in the range between about 50° and 60° C. A typical sample may have a density at 20° C. of about 1.04 and a molecular refraction of about 37.5. It has been suggested that the structure of di-indene corresponds to the formulas (I)

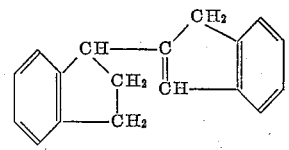

or (II)

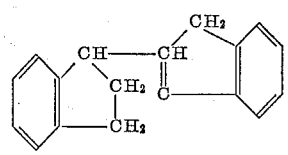

or more broadly to the formula (III)

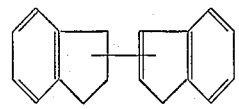

or that it is a mixture containing such isomers.

Furthermore, it is also possible to use di-indene compounds of the above type wherein the benzene rings and the five-membered rings contain one or more alkyl substituents, such as methyl or ethyl; and the five-membered rings, which may or may not contain a double bond, may be heterocyclic, e.g., they may contain oxygen in lieu of one of the ring carbon atoms. The presence of a double bond in the five-membered ring of the di-indene structure may, perhaps, contribute to the eventual reinforcing effect of the novel plasticizers in butyl rubber.

Instead of using the di-indene compounds as such, it is also within the scope of the invention to use high boiling di-indene rich aromatic distillate oil derivable from polymerized coal tar naphtha, i.e., distillate oils containing at least 25% and preferably at least 45% of di-indene. To be useful in this invention, such oil fractions should be substantially free aromatic and olefinic compounds boiling below 300° C., should not have excessive unsaturation, i.e., the di-indene containing oil fraction should have a bromine number of about 70 to 90 cg. Br/g., and should have a mixed aniline point (ASTM) of at least 25° C. Furthermore, where improvement in rubber tack as well as a plasticizing effect are desired, according to this invention it is preferred to use a di-indene plasticizer containing about 45 to 75% of di-indene and about 25 to 55% of aromatic compounds boiling in the range between about 300° and 350° or 400° C.

One such particularly effective di-indene rich oil of coal tar origin, hereinafter referred to as Oil A, is available commercially from the Neville Chemical Company and possesses the physical properties shown in Table I.

TABLE I.—TYPICAL PROPERTIES OF OIL A

| | |
|---|---|
| Di-indene content, percent | 53 |
| Specific gravity at 30° C./15.6° C.[1] | 1.082 |
| Gardner-Holdt viscosity at 25° C. | G–H |
| Gardner color | 7 |
| Neville color | .1 |
| Saybold viscosity, SSU at 210° F. | 40 |
| Mixed aniline point, °C.[2] | 30 |
| Refractive index at 25° C. | 1.6150 |
| Flash point, °F., C.O.C. | 385 |
| Bromine No.[3] | 66.9 |
| Distillation range, °C.: | |
| Initial | 306 |
| Essentially between | 300–360 |
| End point | 357 |

[1] Hydrometer.
[2] ASTM D-1012-62T.
[3] ASTM D-1158-59T.

For example, di-indene rich oils of suitable characteristics can be prepared by polymerization of suitable coal tar naphtha fractions, such as those having a boiling range from about 160° to 200° C., preferably from about 165° to 190° C. These can be polymerized in an otherwise known manner, e.g., at temperatures between about 40° and 150° C., using acidic polymerization catalysts such as sulfuric acid, Friedel-Crafts compounds such as complexes of boron fluoride and ethyl ether, etc. The polymerized oil is then usually decanted from the acid layer, neutralized with aqueous caustic, solid soda ash or the like, and after eventual redecanting from any aqueous layer, the neutralized oil is distilled to recover from it a di-indene rich fraction boiling principally in the range between about 300° and about 360° C. corrected vapor temperature. (By "corrected vapor temperature" is meant the true normal boiling point of a substance at atmospheric pressure, though the substance may decompose at this temperature and is therefore preferably distilled under reduced pressure at a lower temperature. Thus, for instance, a hydrocarbon fraction having a normal boiling range between 300° and 350° C. cannot be distilled at atmospheric pressure without extensive decomposition but can be satisfactorily distilled between about 170° and about 220° C. at 20 mm. Hg.)

The desired di-indene rich fraction can be conveniently obtained from the neutralized oil by first distilling the latter at atmospheric pressure to a pot temperature of about 200° to 250° C., thus collecting an atmospheric distillate fraction in a yield of about 20 to 30% based on the neutralized oil, then steam distilling the remainder and thus forming a second distillate fraction in a yield of about 50 to 75% based on the neutralized oil and a resinous bottoms fraction in a yield of about 5 to 20% based on the neutralized oil. Finally, the steam distillate is redistilled under reduced pressure to recover from it the aforesaid di-indene rich fraction as a bottoms product in a yield of about 45 to 65% based on the neutralized oil. Of course, instead of employing the particular fractionation scheme just described other distillation procedures may be used, e.g., the residue from a mild atmospheric distillation may be distilled in a fractional distillation tower under reduced pressure and the desired di-indene rich fraction recovered directly in such a distillation as an overhead fraction. A useful di-indene rich fraction can also be obtained by distilling a polymerized coal tar napththa under reduced pressure, e.g, 20 mm. Hg, so as to strip from it material boiling below about 300° C. V.T. and thus produce a bottoms fraction possessing the minimum di-indene content required for the purpose of this invention.

If desired, the neutralized oil may be filtered through a filter press or in any suitable manner prior to distillation to remove any solids such as excess soda ash and to clarify the oil when an aqueous base is used for neutralization.

While many different satisfactory procedures may be employed by those skilled in the art, an illustrative preparation of a specific di-indene rich oil suitable for the present purposes will now be described. The feed employed was a coal tar heavy naphtha boiling from about 165° to about 190° C. It had a polymerizable content of about 68% of which more than half was indene. The "polymerizable content" as used herein refers to the volume percent of the naphtha which can be converted to a coumarone-indene resin by the usual sulfuric acid polymerization procedure for making coumarone-indene resins. Five parts by volume of this coal tar naphtha are mixed with two parts by volume of 55 wt. percent $H_2SO_4$ in a glass lined vessel. The mixture is then heated and maintained at 125° C. under reflux until the specific gravity of the oil in the charge no longer changes. Approximately 2.5 hours are required to reach this stage. The acidic polymerized oil is decanted from the acid layer and charged to a neutralizing vessel where enough 20% aqueous caustic solution is added until a pH of 7 (test paper) is reached. The resulting mixture is held at 80° C. for about thirty minutes while agitating whereupon the caustic layer is drained and the oil layer is filtered through a bed of finely divided attapulgite clay such as Florida fuller's earth in order to clarify it. The clarified oil is then divided into two parts.

One part is distilled under 20 mm. Hg pressure to top off material boiling below 300° C. V.T., leaving a di-indene rich bottom product "B–1" (52.5% based on the oil charged). The other part is batch distilled under atmospheric pressure until a port temperature of 250° C. is reached whereupon steam is introduced into the distillation pot to begin steam stripping, the atmospheric distillate and the steam distillate being collected as separate fractions. Pot temperature during steam stripping is held at 235° to 245° C. and the steam distillation continued until a steam condensate/steam distillate ratio of 20/1 is reached.

The distillate oil coming over during the initial stages of the steam distillation has a gravity lighter than water and consequently floats on top of the steam condensate. However, as the distillation continues the gravity of the distillate oil increases so that the distillate oil settles beneath the water to the bottom of the receiver before the steam distillation is completed. Finally, the steam condensate is decanted from this heavy oil distillate and water is removed from the latter by azeotroping with toluene. The remaining dried heavy oil is charged to a vacuum distillation unit where it is topped under reduced pressure (20 mm. Hg) to a corrected vapor temperature of 275° C. (148° C. at 20 mm. Hg). The bottoms is recovered as a light colored resinous product (Ring and Ball softening point 54°–55° C.).

The following product distribution is thus obtained:

|  | Yield, percent based on polymer oil |
|---|---|
| Atmospheric distillate (0–250° C. pot temp.) | 26 |
| Total steam distillate: | 67 |
| Vacuum distillate (end point less than 300° C. V.T.) | 11 |
| Vacuum bottles (di-indene fraction "A-1") | 56 |
| Resin bottoms (R&B soft point 55° C.), resin "R" | 7 |
|  | 100 |

Infrared analysis showed that this di-indene fraction "A-1" contains 62.5% di-indene and otherwise has essentially the characteristics set forth in Table I hereinabove.

Another di-indene rich fraction suitable for use in accordance with the present invention was obtained from the heavy coal tar solvent naphtha described above by heating it in the presence of sulfuric acid, while agitating, to a temperature of 55° to 60° C. and keeping the mixture at this temperature for 6 hours. 120 volumes of 57° Bé.' $H_2SO_4$ was mixed with 1500 volumes of the solvent naphtha. After draining the acid from the polymerized oil the latter was neutralized by addition of 4 weight percent of a 50/50 mixture of attapulgite clay and lime and agitating the mixture for 15 minutes at 50° C. Finally, the neutralized oil was filtered to remove the clay-lime mixture, divided into two parts, and one part again topped to 300° C. V.T. and the other fractionated by a combination of atmospheric, steam and vacuum distillation as in the preceding example. In this instance the following products were recovered:

|  | Yield, percent based on polymer oil |
|---|---|
| (I) Vacuum Topped Bottoms (product "B-2"), 300° C. V.T. | 62 |
| (II) Atmospheric Distillate (0–250° C.) | 31 |
| Total Steam Distillation | 64 |
| Vacuum distillate (end point less than 300° C. V.T.) | 10 |
| Vacuum bottoms (di-indene fraction "A-2") | 54 |
| Resin bottoms | 5 |
|  | 100 |

For comparison, a polymerized coal tar naphtha fraction (Oil "L") having a corrected initial boiling point of 300° C. but possessing a di-indene content of only about 20% was also tested as a plasticizer material for butyl rubber. The characteristics of the several plasticizer oils tested are summarized in Table II.

Butyl rubber, to which the present invention applies, is a well known elastomer. As used in this specification, the term "butyl rubber" refers to a rubber-like material prepared by reacting 70 to 99.5 parts of a $C_4$ to $C_7$ iso-olefin, e.g., isobutylene or 2-methyl-1-hexene, with 30 to 0.5 parts of a $C_4$ to $C_6$ conjugated diolefin such as butadiene-1,3, isoprene, cyclopentadiene or hexadiene-1,3 or mixtures thereof. Minor amounts of cross-linking monomers such as divinyl benzene can also be present. The preferred polymer is obtained by reacting 95 to 99.5% of isobutylene with 5 to 0.5% of isoprene. The polymerization is usually carried out at a temperature between —60° and —130° C. in an inert low boiling, non-complex forming diluent such as methyl chloride. A Friedel-Crafts metal halide, notably aluminum chloride or bromide, is used as catalyst. The resulting polymer typically has a Staudinger molecular weight between 20,000 and 150,000, preferably 45,000 to 60,000, and an iodine number between 0.5 and 50, preferably between 1 and 15. The preparation of butyl rubber is more fully described in U.S. Patent 2,356,128 and elsewhere.

In practicing the present invention, about 1 to 25 parts, preferably 3 to 15 parts, of di-indene in substantially pure form or as a di-indene rich oil of the kind described above is compounded into 100 parts of butyl rubber in an otherwise customary manner. The optimum proportion of plasticizer or plasticizers for any given case will of course be determined by factors such as the molecular weight of the butyl rubber used, the particular compounding recipe employed, the intended use of the vulcanizate, etc. In addition to the di-indene plasticizer, various other materials are compounded into the rubber in accordance with otherwise well known principles. Some illustrative examples of such materials include one or more vulcanization agents such as sulfur (e.g., 1–15 parts), one or more sulfur-containing vulcanization accelerators such as tetramethylthiuram disulfide and 2-mercaptobenzothiazole (e.g., 0.5–3 parts), zinc oxide (e.g., 1–10 parts), stearic acid (e.g., 0–3 parts); sulfur-free curing agents (e.g., 1–10 parts) such as paraquinone dioxime in conjunction with lead oxide; carbon black (e.g., 0–100 parts, preferably 30 to 70 parts); inert fillers, stabilizers, anti-oxidants, etc. Compounding of the various ingredients into the rubber can be accomplished in the usual manner in a Banbury mixer or on an open-roll mill or partly in a Banbury mixer and partly on an open-roll mill. The resulting rubber compound is then generally fabricated into a product such as a multi-ply tire in an otherwise well known manner, and the product is then cured by heating at temperatures in the range between about 100° and 200° C. for periods which may range from about 2 to 30 minutes or more, e.g., 10 to 20 minutes.

EXAMPLES

The practice of the invention and its advantages are further illustrated in the following examples. The formulation used in this work along with the milling procedure are listed below in Table III.

TABLE II.—PLASTICIZER OILS

| Oil Sample | Bromine No.[1] | Wt. percent di-indene[2] | Mod. Wijs Iodine No.[3] | Aniline Pt., °C., Mixed[4] |
|---|---|---|---|---|
| L | 62 | 20.2 | 105 | 24.8 |
| A-1 | 80 | 62.5 | 139 | 25.6 |
| A-2 | 81.7 | 46.7 | 135 | 24.8 |
| B-1 | 81 | 41.5 | 118 | 28.8 |
| B-2 | 86.3 | 37.3 | 118 | 33.6 |

[1] ASTM D-1158-59T.
[2] IR Method (using peak wavelength of about 13.95μ for reference).
[3] Neville 12.09-56T.
[4] ASTM D-1012-62T.

TABLE III.—COMPOUNDING FORMULATION AND PROCEDURE

| Material | Parts by Wt. |
|---|---|
| Butyl Rubber (Enjay Butyl 268) | 100 |
| Semi-reinforcing Carbon Black (Pelletex NS) | 45 |
| Zinc Oxide (Black Label No. 20) | 5 |
| Stearic Acid | 1 |
| Tetramethylthiuram Disulfide (Methyl tuads) | 1.5 |
| 2-mercaptobenzothiazole (Captax) | 1 |
| Sulfur (Blackbird) | 1.25 |
| Plasticizers, as listed | 10 |

TABLE III—Continued

| Milling Procedure | Time (in minutes) | |
|---|---|---|
| | First Series, 270–295° F. | Second Series, 270–295° F. |
| Roll Temperature: | | |
| Butyl Mastication | 5 | 5 |
| Carbon Black and Stearic Acid | 7 | 7 |
| Continued Mastication | 8 | 8 |
| Zinc Oxide and Accelerators | | 5 |
| | 140–150° F. | 290° F. |
| Zinc Oxide | 3 | |
| Accelerators | 2 | |
| Sulfur | 5 | |
| Plasticizer | | 6 |
| | 240–250° F. | 190° F. |
| Plasticizer Addition | 15 | |
| Sulfur | | 2 |

Roll Temperature and Sheet off: 180–200° F.

The plasticizers used were:
(1) A 70/30 mixture of Amberol ST–137X (phenol-formaldehyde resin) and Pentalyn K (pentaerythritol ester of modified rosin) was used as a control representative of the prior art.
(2) Di-indene crystals, recrystallized from methanol (prepared according to the method described in Can. J. Res., 13B, pp. 228–55 (1935)).
(3) Oil "L," di-indene content 20.2% (prior art).
(4) Oil "A–1," di-indene content 62.5%.
(5) Oil "A–2," di-indene content 46.7%.
(6) Oil "B–1," di-indene content 41.5%.
(7) Oil "B–2," di-indene content 37.3%.
(8) Resin "R" (indene polymers higher than dimer).

Test sheets of the several plasticized rubber compounds were cured for 10, 12, 15 and 18 minutes at 320° F. and physical properties of all vulcanizates were determined. Table IV contains the unaged physicals for the 10-minute vulcanizates and also the averaged values for the 10-, 12-, 15- and 18-minute vulcanizates. Actually, variations in curing time between 10 and 18 minutes result only in relatively minor differences and the 10-minute cures in most instances produced or approached optimum results.

TABLE IV.—FIRST SERIES-UNAGED

| Plasticizer | Hardness, Shore A Durometer | Modulus (p.s.i.) | | Tensile Strength (p.s.i.) | Elongation, percent | Crescent Tear (p.p.i.) | Unvulcanized Tack Rating* | |
|---|---|---|---|---|---|---|---|---|
| | | 300% | 500% | | | | 5 Days After Milling | After 23 Days |
| None: | | | | | | | | |
| 10' cure | 52 | 630 | 1,120 | 1,550 | 605 | 127 | 4 | 8 |
| Average | 52 | 690 | 1,170 | 1,365 | 540 | 120 | | |
| Control (Amberol-Pentalyn): | | | | | | | | |
| 10' cure | 50 | 500 | 955 | 1,450 | 620 | 119 | 3 | 9 |
| Average | 50 | 525 | 995 | 1,385 | 595 | 117 | | |
| Oil "L": | | | | | | | | |
| 10' cure | 55 | 380 | 645 | 1,485 | 675 | 108 | 2 | 4 |
| Average | 55 | 390 | 655 | 1,445 | 660 | 104 | | |
| Oil "A–1": | | | | | | | | |
| 10' cure | 45 | 265 | 525 | 2,010 | 795 | 247 | 1 | 1 |
| Average | 45 | 265 | 490 | 2,045 | 815 | 243 | | |
| Oil "A–2": | | | | | | | | |
| 10' cure | 46 | 330 | 615 | 2,000 | 730 | 210 | 1 | 2 |
| Average | 47 | 295 | 535 | 2,000 | 780 | 241 | | |
| Oil "B–1": | | | | | | | | |
| 10' cure | 47 | 310 | 570 | 2,060 | 775 | 238 | 2 | 7 |
| Average | 48 | 330 | 620 | 1,975 | 740 | 227 | | |
| Oil "B–2": | | | | | | | | |
| 10' cure | 48 | 350 | 650 | 2,110 | 765 | 228 | 2 | 6 |
| Average | 46 | 320 | 580 | 1,895 | 735 | 216 | | |
| Di-indene: | | | | | | | | |
| 10' cure | 45 | 245 | 465 | 1,920 | 795 | 236 | 3 | 3 |
| Average | 45 | 230 | 440 | 1,815 | >790 | 235 | | |

*In determining tack, the uncured rubber stock is folded over and hand pressed together, then pulled apart by hand an estimate of tack is made by considering the amount of force required to pull the stock apart and also considering the number of stringy "legs" which are extended during the pull-apart. "1" indicates the best tack and higher numbers indicate progressively less tack.

TABLE V.—AVERAGED AGED PHYSICALS

| Plasticizer | Hardness, Shore A Durometer | Modulus (p.s.i.) | | Tensile Strength (p.s.i.) | Elongation, Percent | Crescent Tear (p.p.i.) |
|---|---|---|---|---|---|---|
| | | 300% | 500% | | | |
| None | 53 | 745 | | 1,145 | 465 | 128 |
| Control (Amberol-Pentalyn) | 51 | 590 | 1,135 | 1,200 | 510 | 116 |
| Oil "L" | 59 | 470 | | 780 | 490 | 108 |
| Oil "A–1" | 47 | 340 | 635 | 1,780 | 790 | 217 |
| Oil "A–2" | 48 | 360 | 665 | 1,725 | 745 | 171 |
| Oil "B–1" | 49 | 405 | 715 | 1,695 | 705 | 162 |
| Oil "B–2" | 47 | 370 | 690 | 1,675 | 720 | 194 |
| Di-indene | 46 | 280 | 540 | 1,770 | 795 | 216 |
| Resin "R" | 51 | 520 | 900 | 1,880 | 665 | 153 |

TABLE VI
[Vulcanizate properties with reference to control; also, retention of properties on aging]

| Plasticizer | Unaged, percent of Control | | | Aged, percent of Control | | | Aged, percent of Unaged | | |
|---|---|---|---|---|---|---|---|---|---|
| | Tensile Strength | Elongation | Crescent Tear | Tensile Strength | Elongation | Crescent Tear | Tensile Strength | Elongation | Crescent Tear |
| None | 99 | 91 | 103 | 95 | 91 | 110 | 84 | 86 | 107 |
| Control (Amberol-Pentalyn) | 100 | 100 | 100 | 100 | 100 | 100 | 87 | 87 | 99 |
| Oil "L" | 104 | 111 | 89 | 65 | 96 | 93 | 54 | 74 | 104 |
| Oil "A-1" | 148 | 137 | 208 | 148 | 155 | 187 | 87 | 95 | 89 |
| Oil "A-2" | 137 | 124 | 185 | 140 | 141 | 167 | 88 | 98 | 90 |
| Oil "B-1" | 144 | 131 | 206 | 144 | 146 | 147 | 86 | 96 | 71 |
| Oil "B-2" | 143 | 125 | 194 | 141 | 138 | 140 | 86 | 96 | 71 |
| Di-indene | 131 | >133 | 200 | 147 | 156 | 186 | 97 | 100 | 92 |
| Resin "R" | 140 | 118 | 126 | 157 | 111 | 132 | 97 | 87 | 104 |

TABLE VII.—SECOND SERIES, UNAGED

| | No Plasticizer | Control | Oil "A-1" | Oil "A-2" | Oil "B-2" |
|---|---|---|---|---|---|
| Di-indene Content | | | 62.5 | 46.7 | 37.3 |
| Minutes Cure at 320° F | 10 | 10 | 10 | 10 | 10 |
| Shore A Durometer | 55 | 55 | 47 | 48 | 50 |
| Tensile Strength (p.s.i.) | 1,595 | 1,820 | 2,320 | 2,480 | 2,440 |
| Elongation (percent) | 530 | 665 | 770 | 735 | 735 |
| Unvulcanized Tack: [1] | | | | | |
| Initial (1 Hr. after Milling) | 2 | 1 | 1 | 1 | 1 |
| 10 Days | 5 | 4 | 1 | 2 | 3 |
| St. Joe Ball Rebound (percent): [2] | | | | | |
| 78° F | 7 | 7.5 | 8.5 | 8.4 | 8 |
| 160° F | 23 | 20 | 23 | 23.3 | 22.1 |
| 212° F | 39.5 | 33 | 34 | 37.5 | 31 |
| Mooney Viscosity: | | | | | |
| Small Rotor at 250° F | | | | | |
| Minimum Mooney Visc | 32.5 | 29.0 | 22.5 | 23 | 24 |

[1] "1" is best.
[2] The higher the value, the better the heat dissipation. Procedure: A ½ inch ball bearing is dropped 10 inches down from an electromagnet onto a portion of the rubber specimen previously determined to be .075 inch thick, the specimen being placed on a 15° sloping plane. The ball is allowed to bounce onto and dent a piece of paper placed at a fixed distance from the point of impact. The distance of bounce, $b$, is determined from the position of the dent in the paper. The percent Rebound, $R$, is found from the equation: $R = 4.83b$.

Table V contains averaged values of the same vulcanizates after aging.

Table VI shows the unaged and the aged physicals in relation to the control, as well as the aged physicals in relation to the unaged ones.

Table VII contains rebound and Mooney viscosity data, as well as other physicals for compounds of the second series referred to in Table III.

The tabulated results show that all of the di-indene rich plasticizers tested gave butyl rubber compounds which had better physical properties than either the unplasticized rubber compound or the control compound containing the conventional Amberol/Pentalyn mixture or the compound containing the "L" oil which had a relatively low indene polymer content. The distinctly superior tensile strength, elongation at break and tear resistance, as well as greater softness, are observable both on the unaged and on the oven aged specimens. The excellent plasticizing effect of the novel di-indene type plasticizers is especially striking in terms of elongations and tensile strength at break. The data show that maximum elongations substantially greater than 700% and tensile strengths of about 2,000 p.s.i. can be readily obtained when the novel di-indene rich plasticizers are used as compared with maximum elongations of only about 600% and tensile strengths of only about 1,500 p.s.i. when no plasticizer or when a conventional plasticizer was used. The simultaneous plasticizing and reinforcing effects produced by the novel plasticizers are most unusual and unexpected in that the addition of conventional plasticizers or softeners to butyl rubber normally results in weaker vulcanizates than when no plasticizer is present.

The "R" resin which contained substantial amounts of indene polymers higher than dimers, also resulted in a significant improvement in rubber properties though it is seen that the improvement in tear strength was substantially less than when the preferred di-indene rich oils were used. Further, the preferred di-indene rich oils also produce more tack in the unvulcanized compounds, which is of importance when the compounds are to be used for tire construction or the like. While all of the plasticizers or tackifiers tested gave good tack initially only the compounds which contained the pure di-indene or the di-indene rich distillate oils "A-1" and "A-2" retained adequate tack when stored for 23 days.

After oven aging for 48 hours at 100° C. the compound containing the low di-indene oil "L" had the poorest physicals while the compounds containing di-indene and the two di-indene rich distillate oils "A-1" and "A-2" had by far the best physicals. The compounds plasticized with the more highly polymerized "R" resin and with the two di-indene containing bottoms fractions "B-1" and "B-2" had physicals intermediate between the conventional plasticized compound and the compounds tackified in accordance with the present invention.

The superiority of the novel di-indene type plasticizers is further illustrated by the rebound and Mooney viscosity data shown in Table VII. All of the di-indene oils tested were superior to the conventional plasticizer mixture in improving the rebound, and hence the heat dissipation, of butyl rubber at ambient or moderate temperatures. At higher temperatures, the distillate oils "A-1" and "A-2" produced a noticeably better rebound than the "B-2" oil which was a bottoms cut.

It is also of interest to note that while conventional plasticizers or tackifiers did not appreciably affect the hardness of the vulcanizate and in the case of the "L" oil actually resulted in a net increase in hardness as compared with the unplasticized control, the preferred di-indene rich plasticizers resulted in significantly softer rubber products.

Unless indicated otherwise, it will be understood that all proportions of materials are given on a weight basis throughout the specification and the appended claims.

What is claimed is:

1. A rubbery vulcanizable composition of matter which comprises 100 parts of butyl rubber and 1 to 25 parts of an aromatic hydrocarbon material selected from the group consisting of di-indene and polymerized aromatic hydrocarbon oils which contain at least about 25% of di-indene and boil essentially within the range of from about 300° to about 400° C.

2. A composition of matter according to claim 1 wherein the aromatic hydrocarbon material is crystalline di-indene.

3. A composition of matter according to claim 1 wherein the aromatic hydrocarbon material is a polymerized coal tar naphtha fraction containing at least 45% di-indene.

4. A vulcanizable composition of matter which comprises (A) 100 parts of a butyl rubber copolymer of 95 to 99.5% isobutylene and 5 to 0.5% of a $C_4$ to $C_6$ conjugated diolefin; (B) 3 to 15 parts of a polymerized aromatic coal tar naphtha fraction which contains at least about 25% of di-indene; has a normal boiling range between about 300° and about 400° C.; and has an aniline point greater than 25° C., and a bromine number in the range between about 70 and about 90 cg./g., and (C) an effective amount of a curing agent.

5. A rubber vulcanizate which comprises 100 parts of a butyl rubber copolymer of 95 to 99.5% isobutylene and 5 to 0.5% isoprene; 30 to 70 parts of carbon; 3 to 15 parts of an essentially aromatic hydrocarbon oil which contains about 45 to 75% di-indene and about 25 to 55% of other aromatic compounds, said oil boiling essentially within the range between about 300° and about 400° C.; and an effective amount of sulfur of vulcanization.

6. A process for improving the plastic properties of vulcanizable butyl rubber compounds which comprises compounding 100 parts of unvulcanized butyl rubber with 1 to 25 parts of an aromatic hydrocarbon material selected from the group consisting of di-indene and aromatic oil fractions derived from polymerized coal tar naphtha, boiling substantially completely within the range of from about 300° to about 400° C. and containing at least 25% di-indene.

7. A process according to claim 6 wherein said aromatic material is a polymerized coal tar naphtha fraction containing at least 45% di-indene and having a boiling range such that at least 95% of the oil boils above 300° C. and at least 95% boils below 400° C.

8. An improved process for making multi-ply vulcanized butyl rubber products which comprises forming a plastic rubber compound by mixing 100 parts of butyl rubber with 3 to 15 parts of a polymerized, essentially aromatic hydrocarbon containing 25 to 100% of di-indene ($C_{18}H_{16}$) and boiling substantially completely above 300° C. and below about 400° C., with 30 to 70 parts of carbon black, and with 1 to 5 parts of a sulfur-containing curing agent; fabricating a shaped rubber product from a plurality of plies of said plastic compound; and heating the resulting shaped product to a curing temperature in the range between about 100° and 200° C.

References Cited

UNITED STATES PATENTS

| | | | |
|---|---|---|---|
| 2,226,261 | 12/1940 | Rivkin | 208—22 |
| 2,319,959 | 5/1943 | Tierney | 260—33.7 |
| 2,449,929 | 9/1948 | Corkery | 260—33.6 |
| 2,671,068 | 3/1954 | Bloch | 260—33.6 |

OTHER REFERENCES

"Resins and Plasticizers," The Neville Co., Pittsburgh, Pa., 1945, pp. 5, 6, 8, 18, 45.

JULIUS FROME, *Primary Examiner.*

J. E. CALLAGHAN, *Assistant Examiner.*